(12) United States Patent
Shibutani et al.

(10) Patent No.: US 6,741,783 B2
(45) Date of Patent: May 25, 2004

(54) OPTICAL CABLE ADAPTER OR CONNECTOR

(75) Inventors: Michitomo Shibutani, Tokyo (JP); Isamu Inokoshi, Tokyo (JP); Katsuya Ezawa, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 154 days.

(21) Appl. No.: 09/943,000

(22) Filed: Aug. 31, 2001

(65) Prior Publication Data

US 2002/0028055 A1 Mar. 7, 2002

(30) Foreign Application Priority Data

Sep. 6, 2000 (JP) .......................................... 2000-269928

(51) Int. Cl.$^7$ ................................................. G02B 6/00
(52) U.S. Cl. ........................ 385/134; 385/137; 385/563; 385/54; 385/60; 385/75
(58) Field of Search .............................. 385/53–55, 60, 385/72, 75, 78, 62, 65, 81, 83, 85, 134–138

(56) References Cited

U.S. PATENT DOCUMENTS 6,435,727 B1 * 8/2002 Fingler et al. ................. 385/53
6,572,272 B2 * 6/2003 Ngo ............................. 385/53

\* cited by examiner

*Primary Examiner*—Drew A. Dunn
*Assistant Examiner*—Fayez Assaf
(74) *Attorney, Agent, or Firm*—Kanesaka & Takeuchi (57) ABSTRACT

An adapter or connection comprises a plurality of adapter or connector sections (14) having plugging cavities (18) to which optical cable plugs (25) are detachably plugged. The plugging cavities (18) are arranged in a plane of a panel (32) at an acute angle to the plane thereby preventing light from entering the operator's eye upon plugging.

12 Claims, 14 Drawing Sheets

OPTICAL CABLE ADAPTER OR CONNECTOR

BACKGROUND OF THE INVENTION

1. Field of the Invention

The present invention relates to optical cable adapters or connectors for connecting optical cables.

2. Description of the Related Art

An optical connectors are used to detachably connect optical cables or an optical cable and another optical device in an optical communication system. The optical connector comprises a plug to be connected to an end of the optical cable and an adapter for detachably holding the plug. The adapter is attached to an outer panel of equipment, such as an exchange, under downwardly tilted condition so as to prevent a high-power laser from entering the operator's eye upon connection of the plug into the adapter.

An example of such adapter attachment is disclosed in Japanese patent application Kokai Nos. 10-239530 and 2000-147269.

Figure 14:
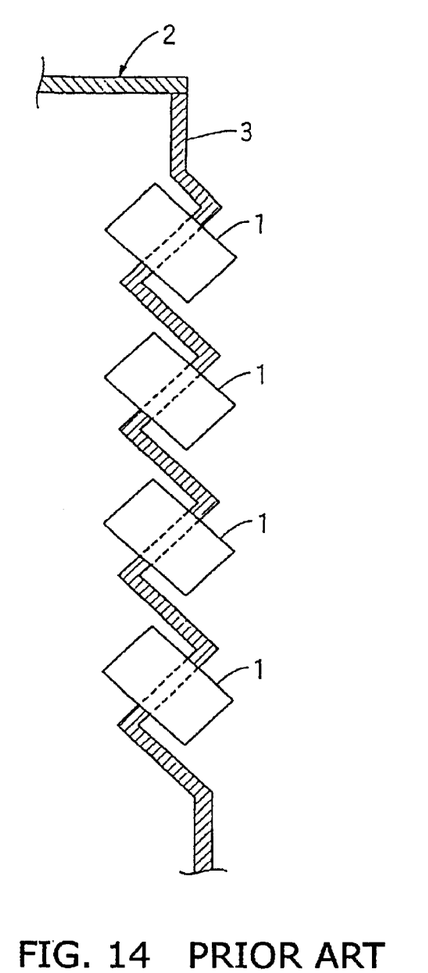
FIG. 14 is a side view of a conventional adapter.

As FIG. 14 shows, a plurality of or four adapters 1 are attached to the outer panel 3 of equipment 2 under downwardly tilted condition. Each adapter occupies a separate space for attachment, keeping the mount density low. The separate attachment of the respective adapters 1 requires much labor in addition to the labor of making the outer panels by bending.

Figure 15:
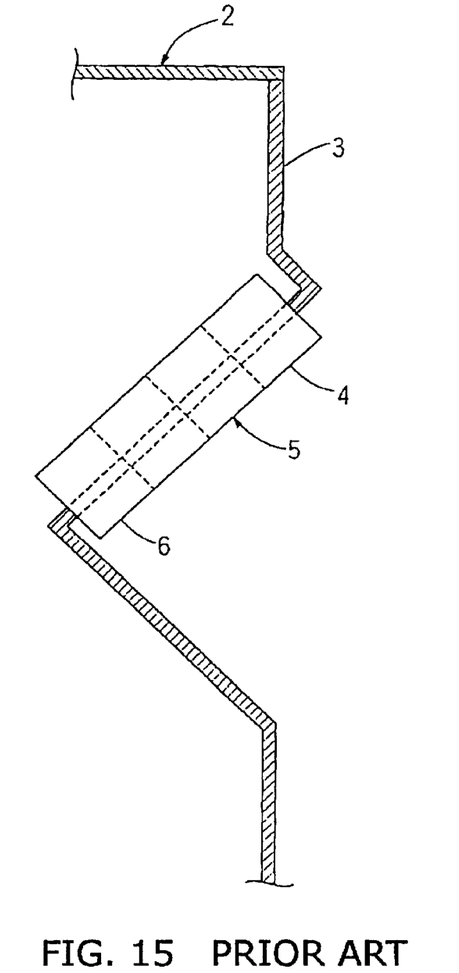
FIG. 15 is a side view of another conventional adapter.

Thus, there was proposed a multiple type adapter 5 consisting of a plurality of adapter sections 4 as shown in FIG. 15.

However, the lowest adapter section 6 of the multiple type adapter 5 is retreated toward the inside of the equipment 2 so deep that the space of the equipment 2 is wasted, reducing the mount density inside the equipment. In addition, it is difficult to perform plugging operation for the lowest adapter section 6.

SUMMARY OF THE INVENTION

Accordingly, it is an object of the invention to provide an optical cable adapter or connector capable of protecting the operator's eye from laser upon plugging, making the plugging operation easy, and increasing the mount density.

According to the invention there is provided an optical cable adapter or connector to which a plurality of optical cable plugs are detachably connected, which comprises a plurality of adapter or connector sections integrally formed and arranged in a plane of a panel; a plurality of plugging cavities provided in said adapter or connector sections, one for each section, so as to extend at an acute angle with said plane for receiving said optical cable plugs.

It is preferred that said adapter or connector sections are arranged in a stepped fashion. The adapter or connector sections are separated by partition walls. The plugging cavities are adapted to receive two-prong plugs. The adapter or connector further comprises a pair of flange sections obliquely extending from opposite ends of said adapter or connector for securing said adapter or connector.

According to the invention, entrance of the light into the operator's eye is prevented. Plugging to the adapter is made easy.

DESCRIPTION OF THE PREFERRED EMBODIMENTS

Embodiments of the invention will now be described with reference to the accompanying drawings.

Figure 1:
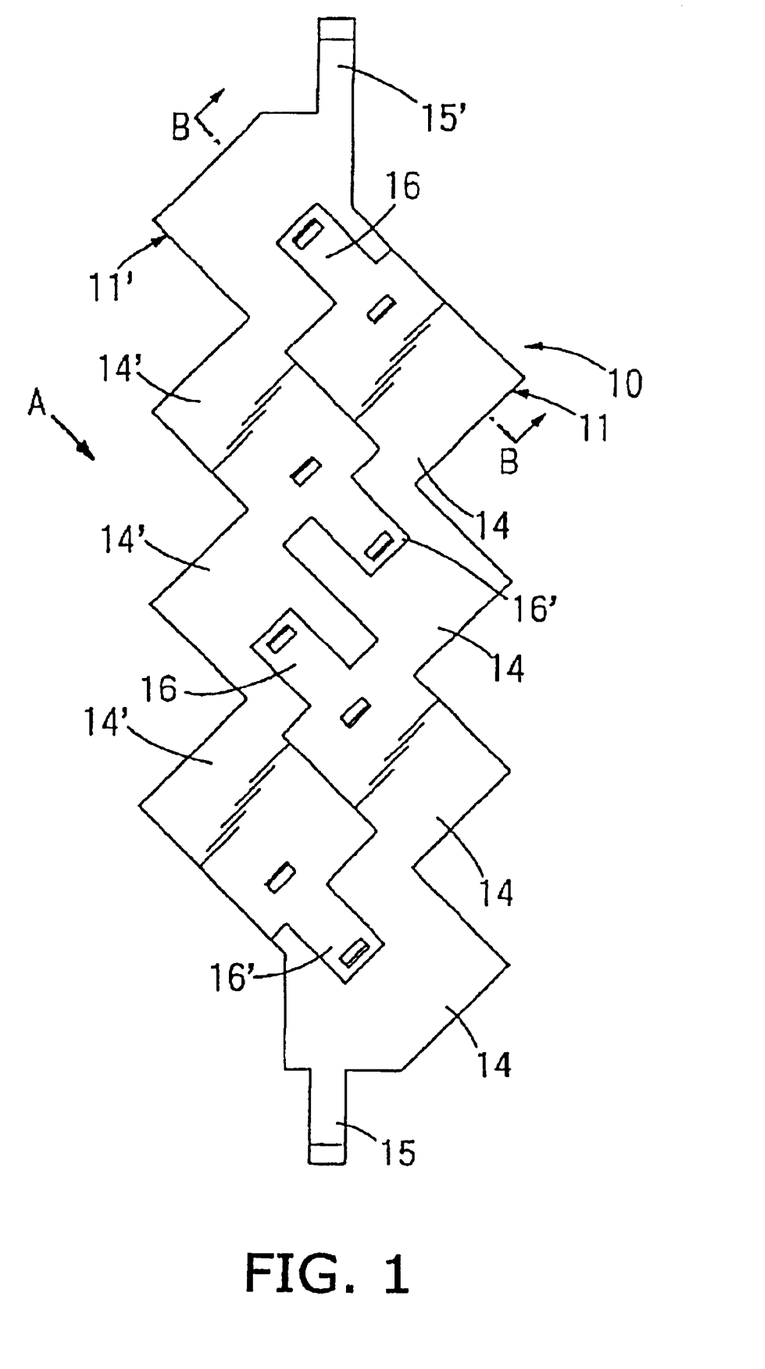
FIG. 1 is a side view of an adapter according to an embodiment of the invention.
Figure 2:
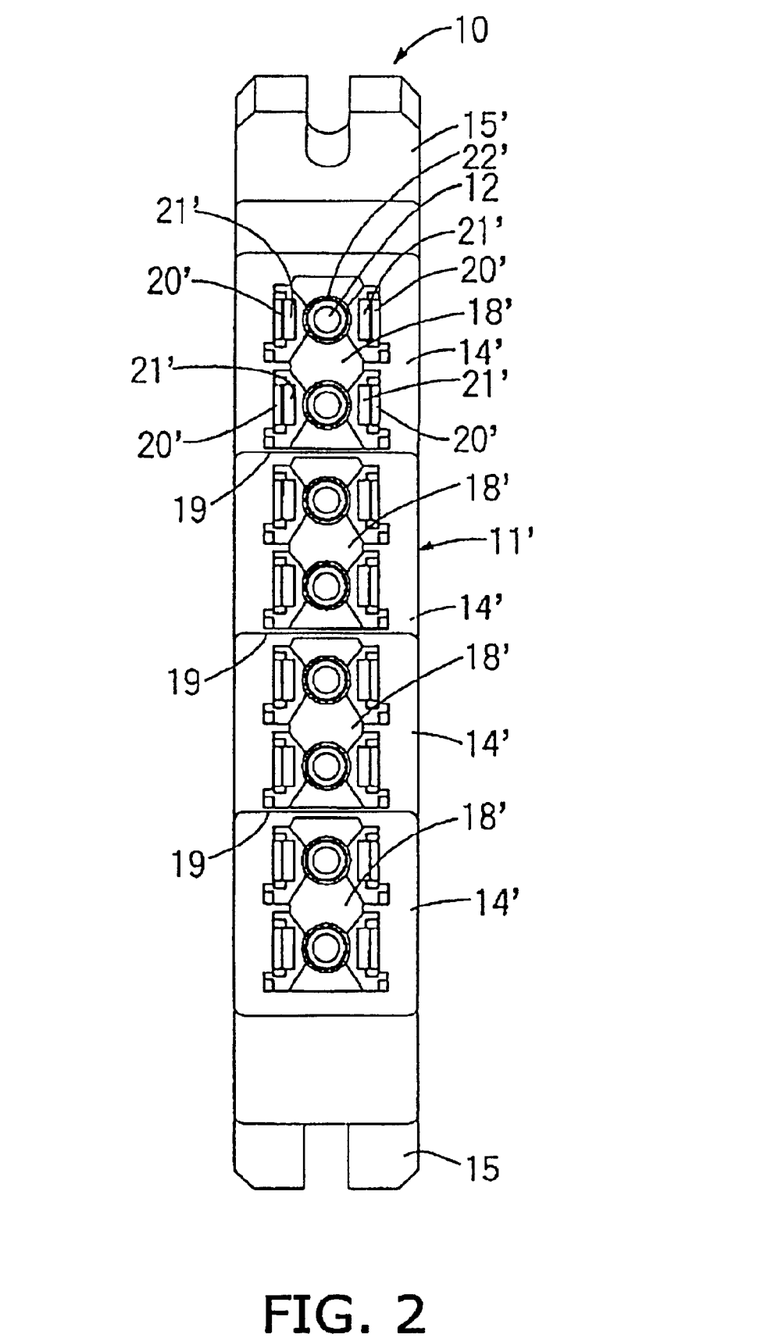
FIG. 2 is a rear view of the adapter viewed from an arrow A.
Figure 3:
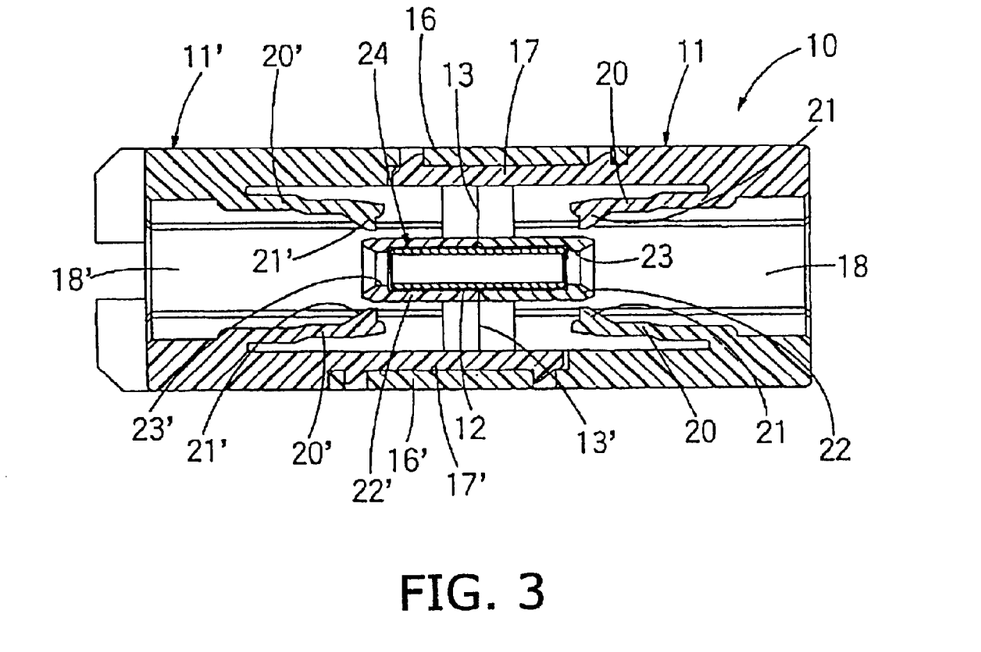
FIG. 3 is a sectional view taken along line B—B of FIG. 1.

In FIGS. 1–3, an adapter 10 comprises a pair of adapter members 11 and 11' made of a resin and a pair of cylindrical split sleeves 12 made of a metal. The adapter members 11 and 11' are joined together such that the respective front faces 13 and 13' abut each other. Both the adapter members 11 and 11' are identical in structure and, therefore, only the adapter member 11 will be described.

The adapter member 11 has a plurality of adapter sections 14 arranged in a stepped fashion and a jaw-shaped flange section 15. The adapter sections 14 are integrally molded at a certain angle, for example, 45 degrees with respect to the flange section 15. Each adapter section 14 has first and second cantilevered engaging tongues 16 and 17 for engagement with engaging tongues 17' and 16' of the adapter section 14' to connect the pair of adapter members 11 and 11'.

A plugging cavity 18 is provided in each adapter section 14, and the respective plugging cavities 18 are separated by partition walls 19. Two sets of plug locks 20, each consisting of a couple of plug locks, are provided in the plugging cavity 18. Each plug lock 20 is formed as a cantilevered beam and has an engaging projection 21 inwardly extending from the free end. Two split sleeve receiving cavities 22 are provided at the front end of the plugging cavity 18. A stop ridge 23 is provided near each opening of the sleeve receiving cavity 22 such that when the adapter members 11 and 11' are connected, two complete sleeve receiving cavities 24 are formed to hold the split sleeve 12 for sliding movement between the stop ridges 23 and 23'.

Figure 4:
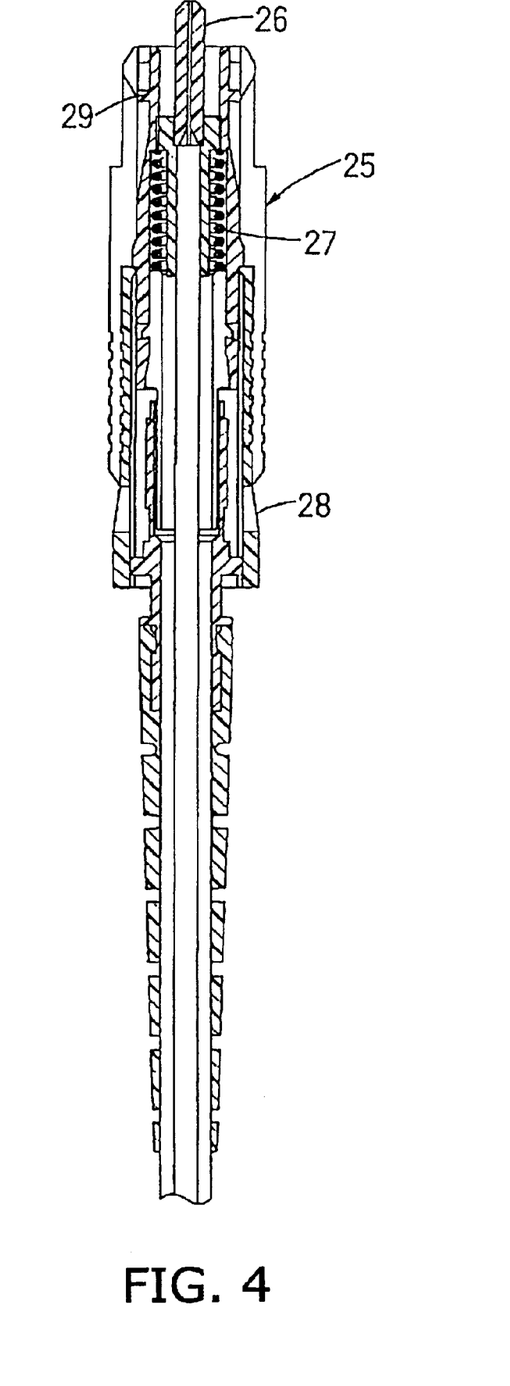
FIG. 4 is a sectional view of a plug for the adapter.

In FIG. 4, a two-prong plug 25 pluggable into the plugging cavity 18 is shown. The plug 25 comprises a pair of ferrules 26 for accommodating the core wires (not shown) of optical cables 30 (FIG. 5), a pair of springs 27 for forwardly biasing the ferrules 26, and a pair of housings 28 for accommodating the ferrules 26 and the springs 27. A pair of engaging projections 29 are provided on opposite sides of the housing 28.

Figure 5:
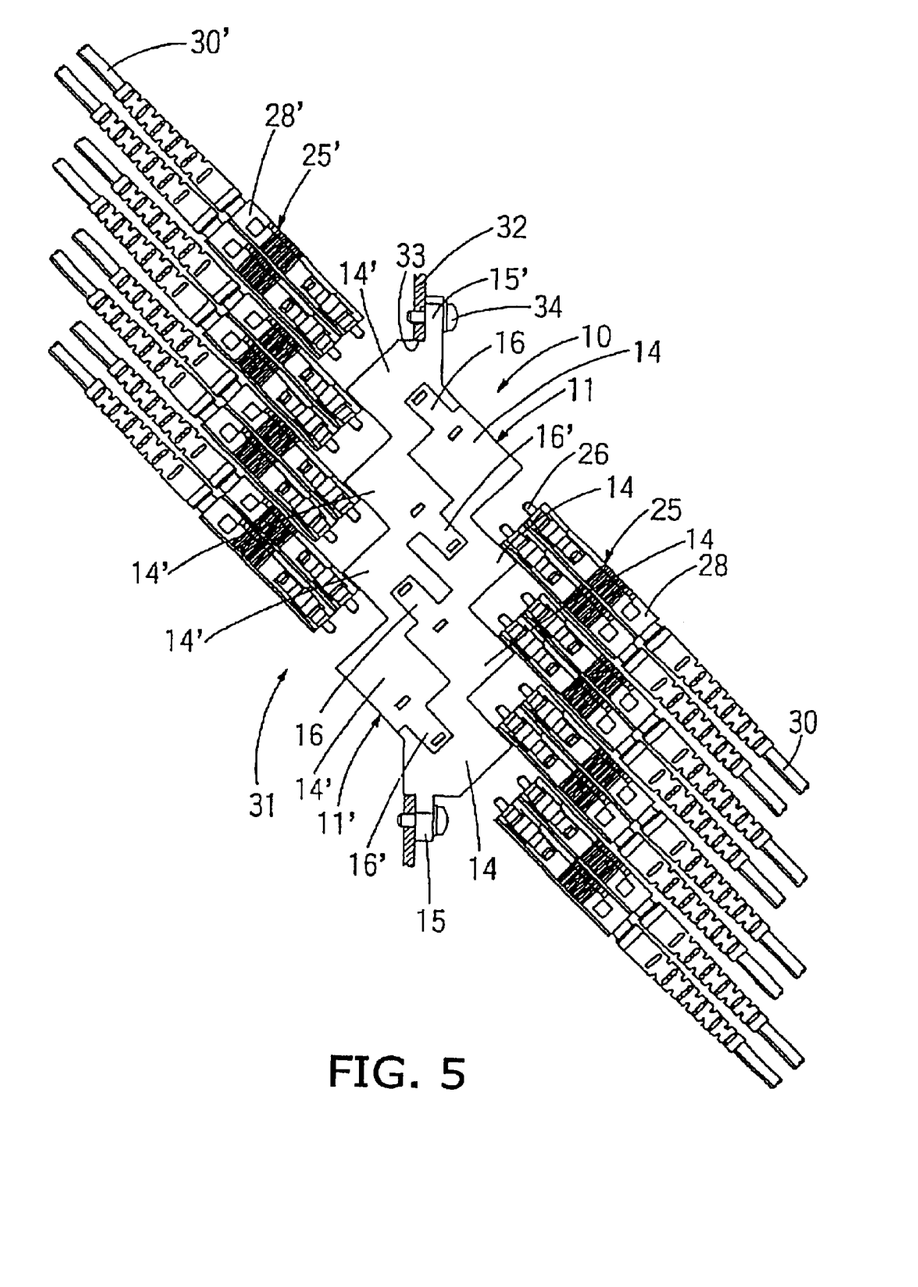
FIG. 5 is a side view of the adapter with detachable plugs.
Figure 6:
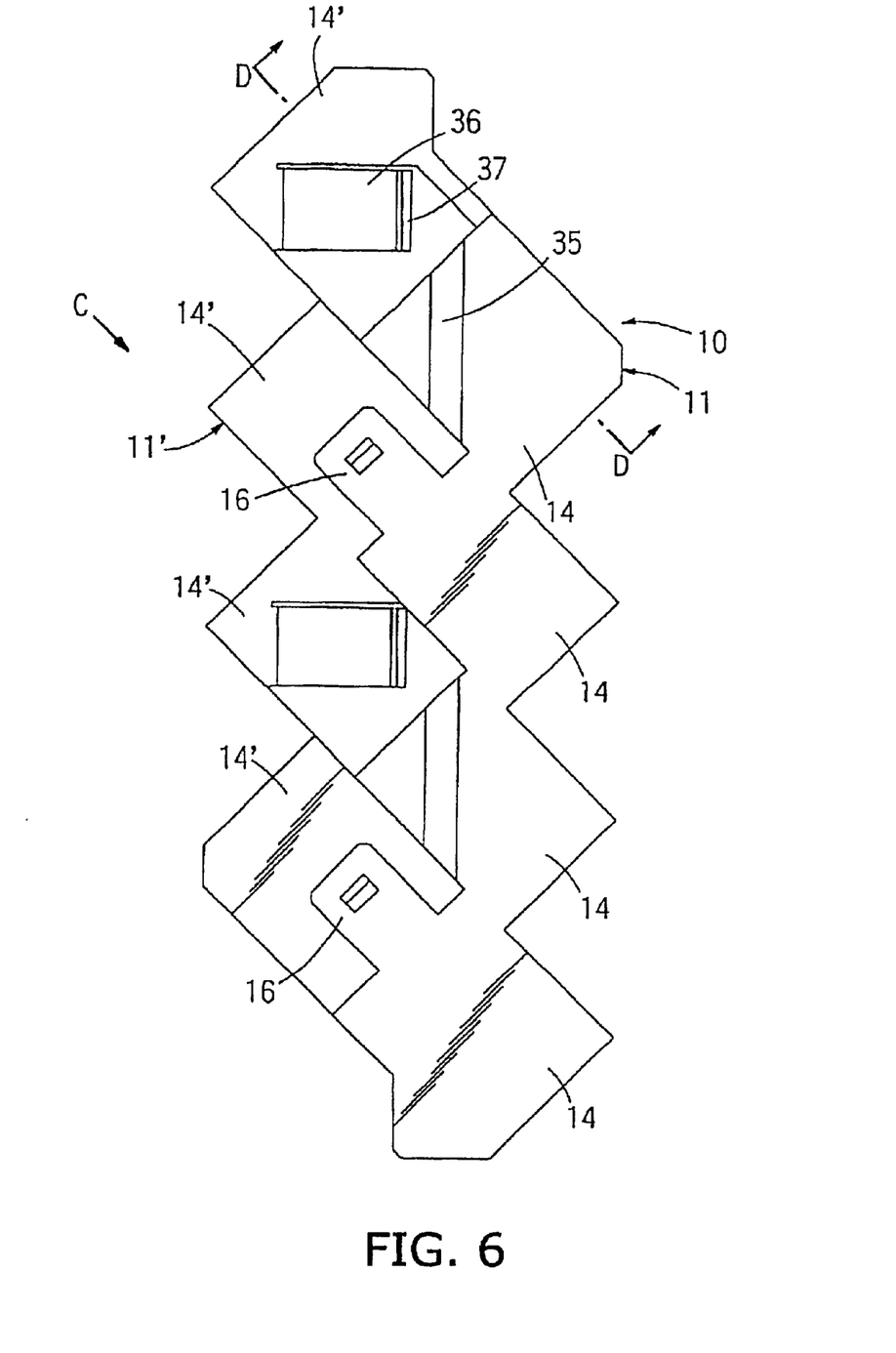
FIG. 6 a side view of an adapter according to another embodiment of the invention.
Figure 7:
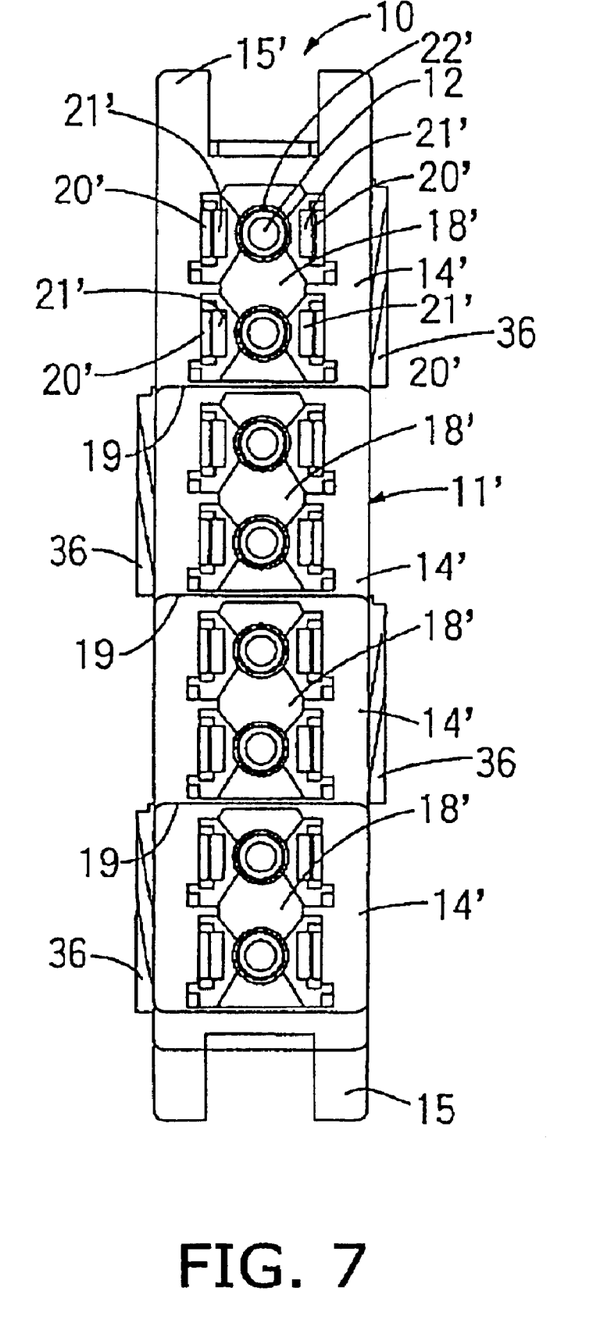
FIG. 7 is a rear view of the adapter of FIG. 6 as viewed from an arrow C.
Figure 8:
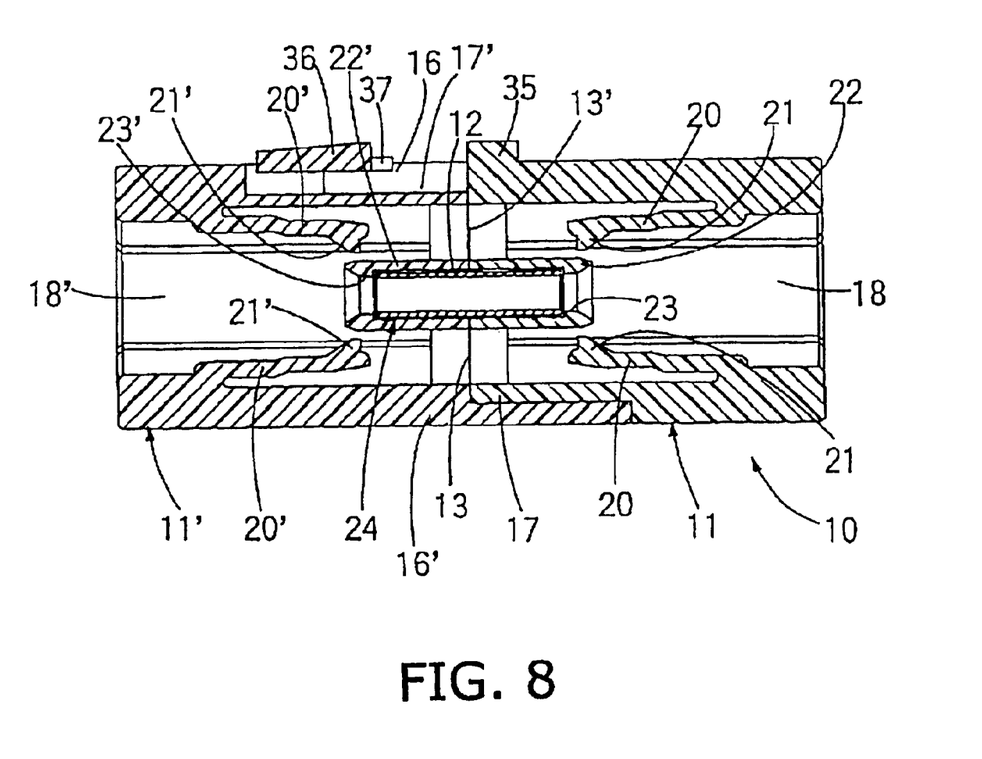
FIG. 8 is a sectional view taken along line D—D of FIG. 6.
Figure 9:
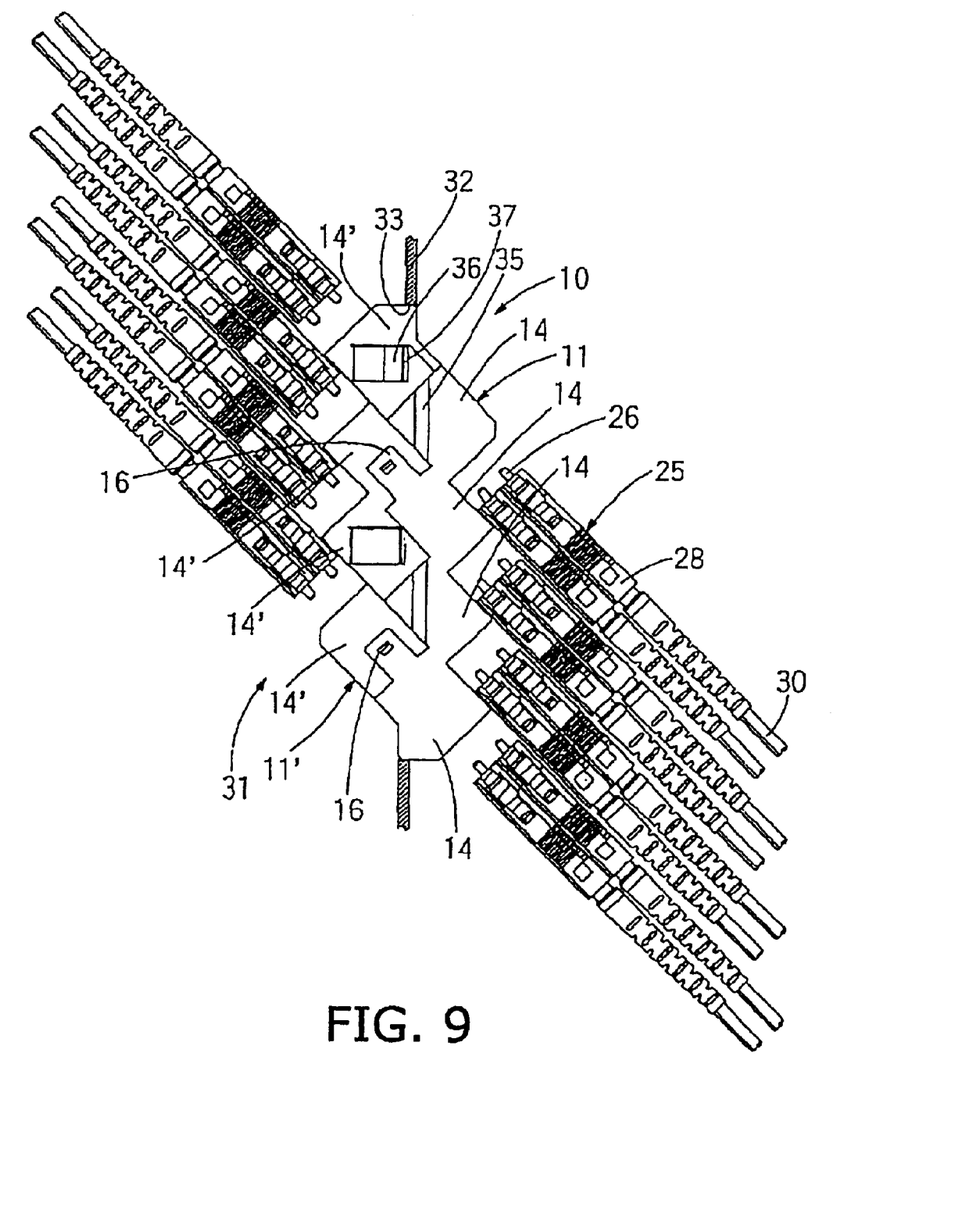
FIG. 9 is a side view of the adapter of FIG. 6 with plugs to be inserted into the adapter.

In FIG. 5, to attach the adapter 10 to the outer panel 32 of equipment 31 having an opening 33, the adapter sections 141 are inserted into the opening 33 from outside such that the plugging cavities 18 face outside downwardly, and the flange sections 15 and 15' are secured to the outer panel 32 with bolts 34. Since the respective adapter sections 14 are tilted by 45 degrees with respect to the flange section 15, the plugging cavities 18 are secured at 45 degrees relative to the outer panel 32.

To connect the two-prong plug 25 into the adapter 10 on the outer panel 32, the plugs 25 and 25' attached to the optical cables 30 and 30' are inserted into the plugging cavities 18 and 18' in obliquely upward and downward directions, respectively. With advance of the plugs 25 and 25', the plug locks 20 and 20' are flexed outwardly by the engaging projections 29 and 29', which abut against the engaging projections 21, and 21'. When the plug locks 20 and 20' pass over the engaging projections 29 and 29', the plug locks 20 and 2' return inwardly, engaging the engaging projections 21 and 21' with the engaging projections 29 and 29'. Consequently, the plugs 25 and 25' are locked in the plugging cavities 18 and 18'. The ferrules 26 and 26' of the plugs 25 and 25' are inserted into the split sleeves 12 and retained in alignment. To unplug the plugs 25 from the adapter 10, the above operation is made in reverse order.

Alternatively, the plugs 25' within the equipment 31 may be fixed to the adapter and only the outer plugs 25 may be made detachable from the connector sections of the equipment 31. These connector sections are made identical with the adapter sections 14.

In FIGS. 6–9, according to another embodiment of the invention, a plurality of jaw sections 35 are provided on each side of the adapter member 11 (two in this embodiment) and a plurality of adapter lock tabs 36 on each side of the adapter member 11'. Each cantilevered adapter lock tab 36 extends toward the corresponding jaw section 35 and has a step-down portion 37 at the free end. When the adapter member 11' of the adapter 10 is inserted into the opening 33 of an outer panel 32, the adapter lock tabs 36 are flexed inwardly by the periphery of the opening 33. When the step-down portions 37 reach the opening 33, the adapter lock tabs 36 return to the original condition and engage the opening 33 to secure the adapter 10 to the outer panel 32.

Figure 10:
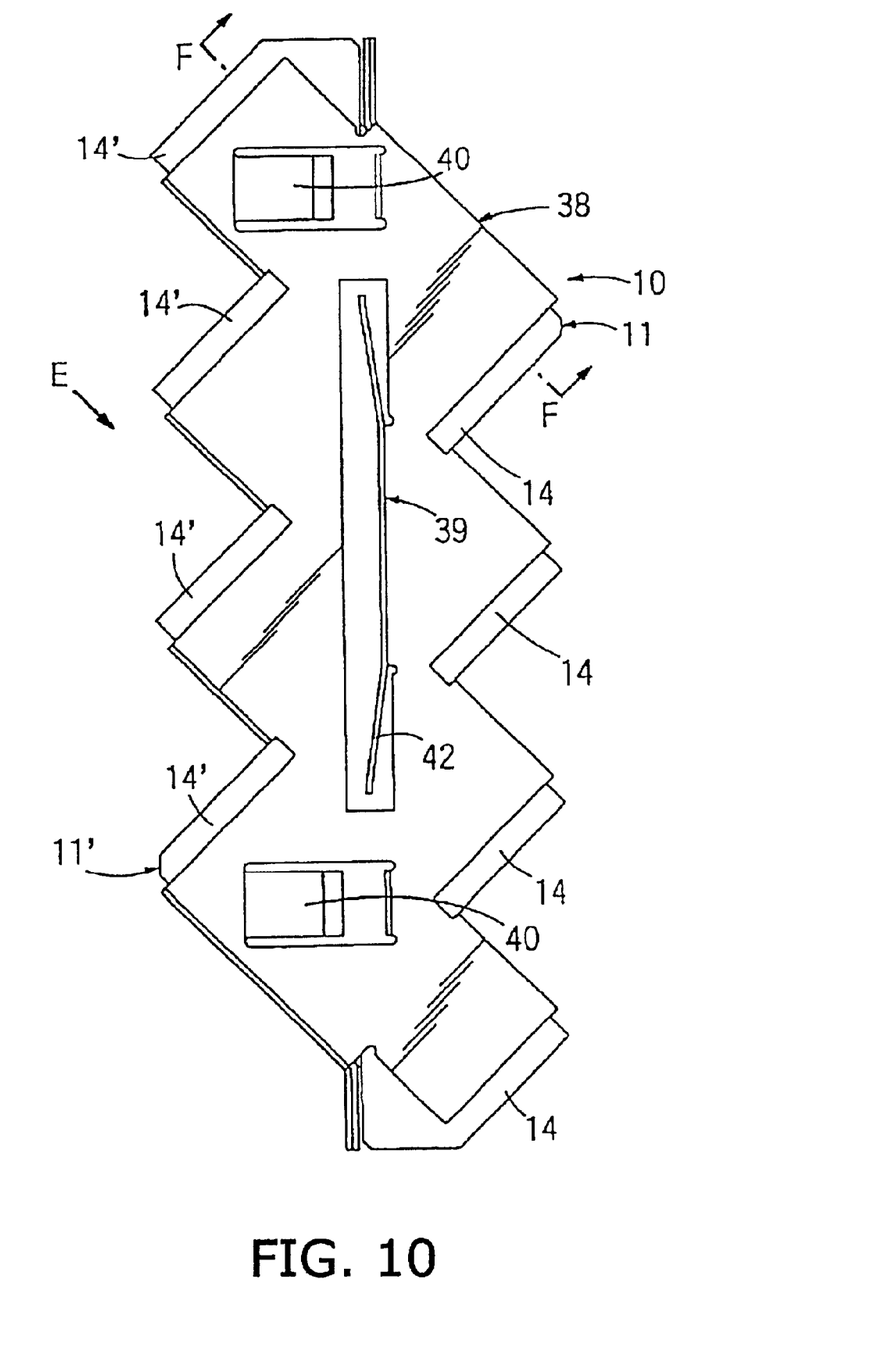
FIG. 10 is a side view of an adapter according to still another embodiment of the invention.
Figure 11:
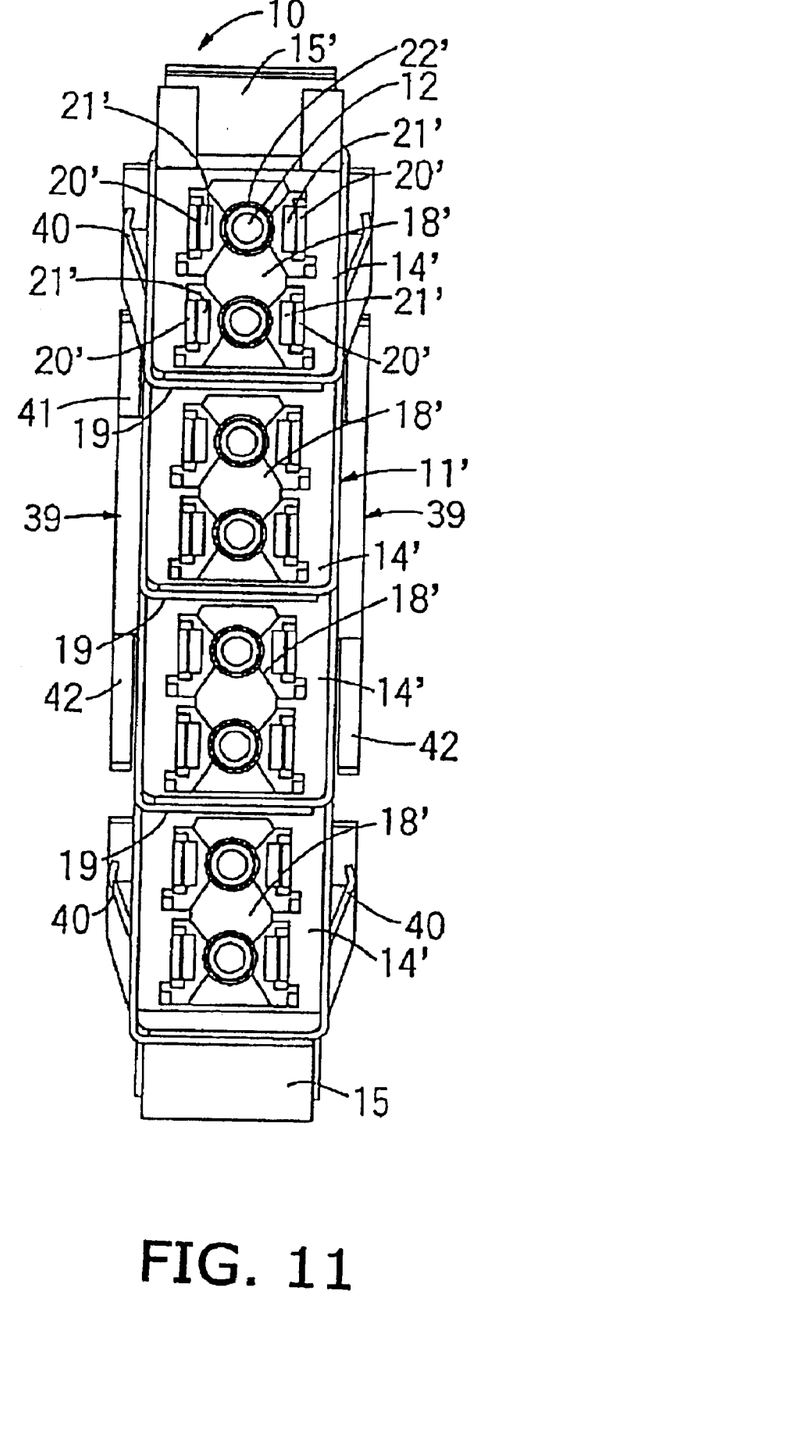
FIG. 11 is a rear view of the adapter of FIG. 10 as viewed from an arrow E.
Figure 12:
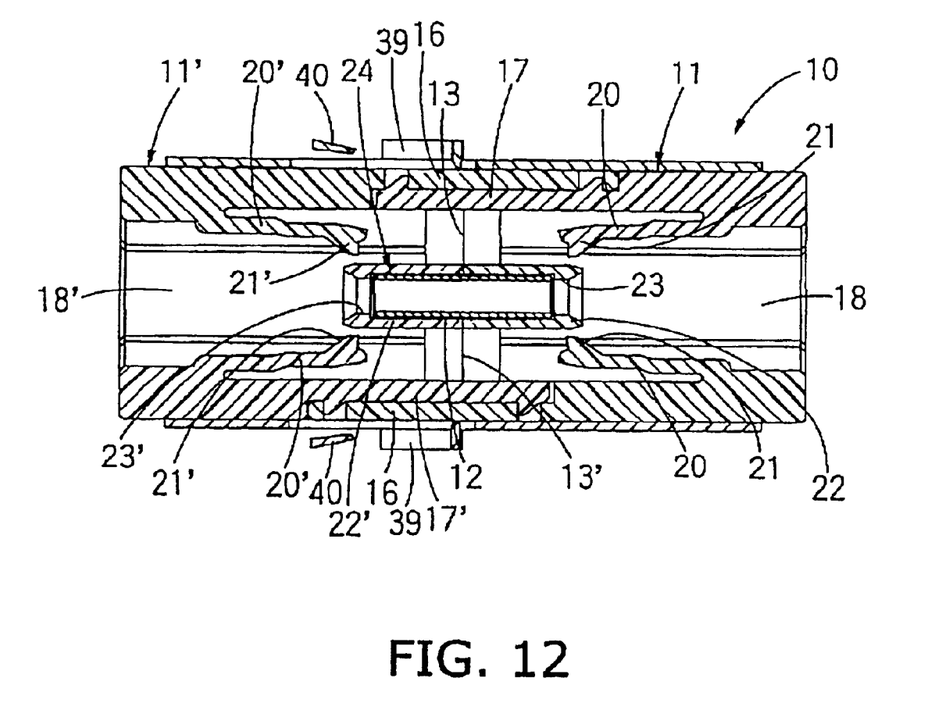
FIG. 12 is a sectional view taken along line F—F of FIG. 10.

In FIGS. 10–12, according to the third embodiment, a pair of attaching members 38 are provided on the adapter members 11 and 11' one for each side instead of the integrated attaching sections of the adapter members 11 and 11'. It is made of a metal, for example, so as to provide a panel abutment member 39 and two cantilevered adapter lock tabs 40. Both ends of the panel abutment member 39 are formed in cantilevered beam. When the adapter 10 is inserted into the outer panel 32 through the opening 33, the adapter lock tabs 40 are flexed inwardly by the periphery of the opening 33. Past the opening 33, the adapter lock tabs 40 return to the original condition so that the periphery of the opening 33 is retained between the panel abutment members 39 and the adapter lock tabs 40, with the result that the adapter 10 is secured to the outer panel 32 by spring forces of the panel abutment members 39.

Figure 13:
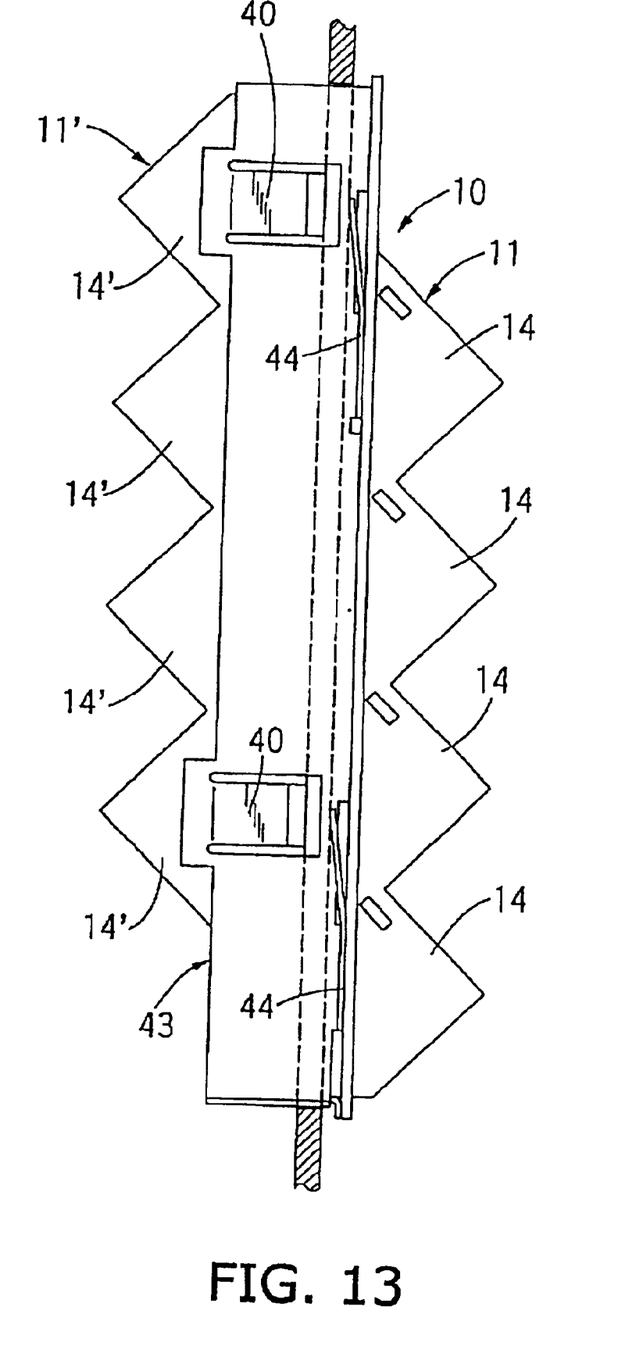
FIG. 13 is a side view of an adapter according to yet another embodiment of the invention.

In FIG. 13, according to the fourth embodiment, a pair of attaching members 43 are provided separately from the adapter members 11 and 11'. The corresponding number of panel abutment members 44 to the number of adapter lock tabs 40 (two in this embodiment) are provided on each attaching member 43. How to attach the adapter 10 to the outer panel 32 is the same as the procedure of the attaching member 38 and, therefore, the description will be omitted.

Alternatively, the adapter 10 has a stepped form in the above embodiments but, as long as the plugging cavities 18 are arranged under upwardly and downwardly tilted conditions along the panel, it may take another form.

The invention is applicable to a single or multi-prong plugs as well as the illustrated two-prong plugs.

As has been described above, according to the invention, the adapter is attached to the panel under tilted condition so that entrance of light into the operator's eye upon plugging is prevented. Also, the plugging cavities are arranged along the panel so that plugging into the adapter is made easy. In addition, a plurality of plugging cavities are integrated so that the mount density is increased. Moreover, it is not necessary to bend a panel material, thus simplifying the panel production.

What is claimed is:

1. An optical cable adapter or connector to which a plurality of optical plugs are detachably connected, comprising:

a pair of adapter members or connector members attached to a panel, wherein said pair of adapter or connector members are joined together such that respective front faces thereof abut on each other; and a plurality of plugging cavities provided in said adapter members or connector members such that said plugging cavities are inclined with respect to said panel.

2. The optical cable adapter or connector according to claim 1, wherein each of said adapter members or connector members comprises a flange section provided at a certain angle with respect to said plugging cavities.

3. The optical cable adapter or connector according to claim 1, wherein said adapter members or connector members are inserted into an opening provided in said panel to be attached to said panel.

4. The optical cable adapter of connector according to claim 2, wherein said flange section is secured to said panel with bolts so as to attach said adapter members or connector members to said panel.

5. The optical cable adapter of connector according to claim 1, wherein one of said pair of adapter members or connector members comprises at least one jaw section on side thereof and the other of said adapter members or connector members comprises at least one cantilevered adapter lock tab on side thereof at a position corresponding to said jaw section so that said pair of adapter members or connector members are attached to a periphery of said panel.

6. An attaching member for attaching an optical cable adapter or connector to a panel, said attaching member provided, separately from adapter members of said adapter or connector members of said connector and comprising:

a panel abutment member provided along said panel; and two cantilevered adapter lock tabs provided in a vicinity of said panel abutment member, wherein a periphery of an opening of said panel is retained between said panel abutment member and adapter lock tabs such that said adapter or connector is attached and inclined to said panel.

7. An optical cable adapter or connector to which a plurality of optical cable plugs are detachably connected, comprising:

a plurality of adapter or connector sections integrally formed and arranged in a plane of a panel and in a stepped fashion;

a plurality of plugging cavities provided in said adapter or connector sections, one for each section, for receiving said optical cable plugs, wherein said plugging cavities extend at an acute angle with said plane so as to align said optical cable plugs such that said optical cable plugs are plugged in mating optical cable plugs inserted in an opposite direction; and a plurality of partition walls for separating said adapter or connector section and defining said plugging cavities.

8. The optical adapter or connector according to claim 7, which further comprises split sleeves.

9. The optical adapter or connector according to claim 8, wherein said plugging cavities has split sleeve receiving cavities for receiving said split sleeves.

10. The optical cable adapter or connector according to claim 7, wherein said plugging cavities are adapted to receive two-prong plugs.

11. The optical cable adapter or connector according to claim 7, which further comprises a pair of flange sections obliquely extending from opposite ends of said adapter or connector for securing said adapter or connector.

12. An optical cable adapter or connector to which a plurality of optical plugs are detachably connected, comprising:
- a pair of adapter members or connector members attached to a panel; and
- a plurality of plugging cavities provided in said adapter members or connector members such that said plugging cavities are inclined with respect to said panel,
- wherein each of said plugging cavities comprises a pair of plug locks opposed to each other.

* * * * *